Aug. 5, 1941.  W. F. METZGAR  2,251,411
WATER HEATER
Filed July 5, 1940
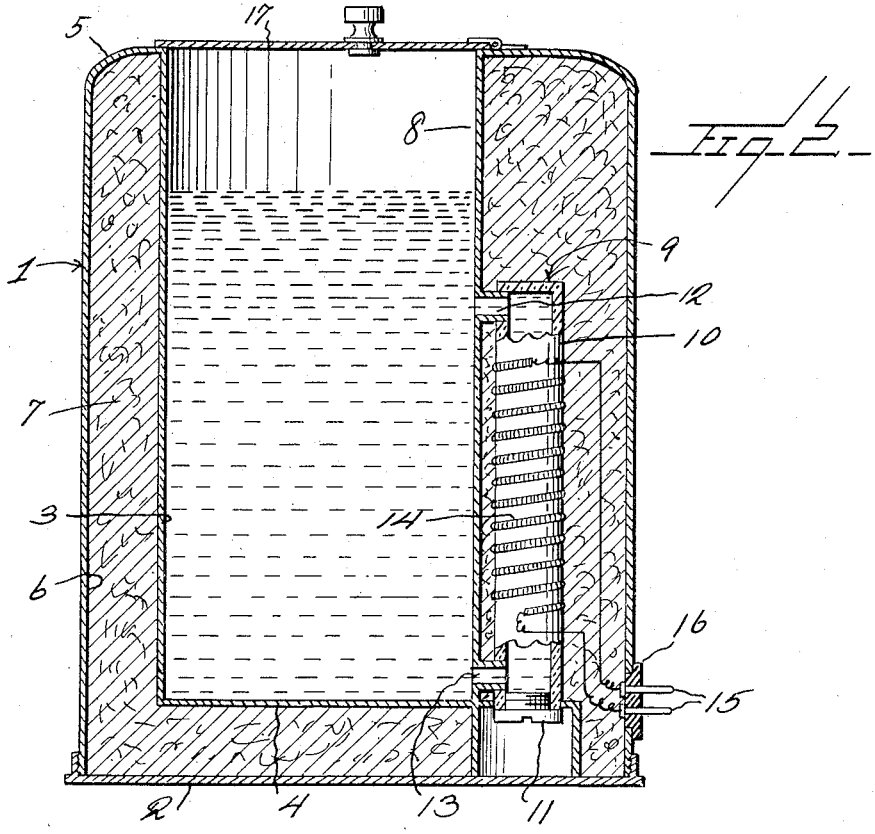
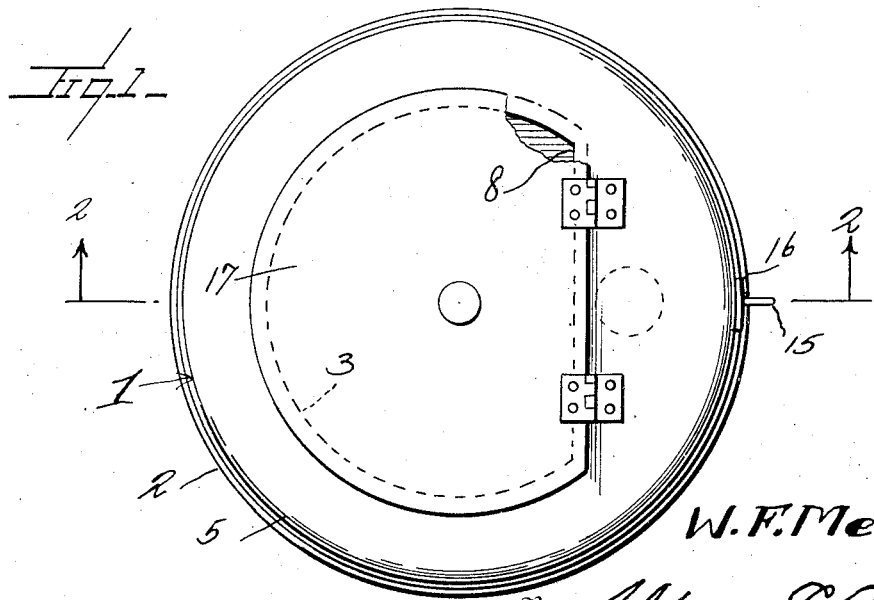
Inventor
W. F. Metzgar
By Watson E. Coleman
Attorney Patented Aug. 5, 1941

2,251,411

UNITED STATES PATENT OFFICE 2,251,411

WATER HEATER

Willard F. Metzgar, Polk, Nebr.

Application July 5, 1940, Serial No. 344,145

2 Claims. (Cl. 219—39)

This invention relates to improvements in water heating devices and pertains particularly to a novel portable water heater which is electrically operated.

The primary object of the present invention is to provide a water heating device which may be conveniently transported or carried about so as to facilitate the heating of a quantity of water as the same is needed, the device being constructed and arranged to be operated by electricity so that it may be made use of for heating a desired quantity of water at any place where a supply of electric current is available.

Another object of the invention is to provide a novel electric water heater which is designed so that the water placed therein will be heated rapidly, the construction being such that the water will be caused to circulate through a narrow heating passage so that the entire body of water in the heater will be rapidly raised in temperature with a minimum consumption of current.

Still another object of the invention is to provide in an electric water heater, a novel construction wherein the heating unit is of tubular form and connected with the water receptacle in such manner that the water may pass from the lower part of the receptacle into the upper part through the unit and thus be caused to circulate during the heating process.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a vertical section through the heater embodying the present invention.

Fig. 2 is a view in top plan of the same.

Referring now more particularly to the drawing, the numeral 1 designates the body of the water heater embodying the present invention, which body constitutes an outer casing which has the removable bottom 2 for the purpose hereinafter described.

Disposed within the casing is the water receptacle 3, the bottom part 4 of which is in spaced relation with the bottom 2 of the casing, while the top edge of the receptacle is connected with the top of the casing by the narrow top wall 5. Thus the receptacle 3 and casing 1 are joined together to form a unit and between these parts is a chamber 6 which is filled with a suitable insulation material 7.

The water receptacle 3 has a portion of its side wall flattened throughout the length of the receptacle, as indicated at 8, so that the space 6 is of increased size or width between this flattened portion 8 of the water receptacle and the wall of the casing 1, throughout a portion of its circular extent providing a suitable space for the disposition between the casing wall and the receptacle of an electric heating unit indicated generally by the numeral 9. The heating unit 9 comprises a tubular body 10 of insulation material which is closed at its upper end and which is fitted at its lower end with the removable plug 11. This tubular body is joined at its upper and lower ends with the interior of the water receptacle through the upper and lower laterally directed coupling nipples 12 and 13, respectively.

Encircling the tubular body 10 and secured thereto or mounted thereon is an electric resistance coil 14, the ends of which are connected with the terminals 15, which are carried by the block of insulation 16 which is secured in the lower part of the wall of the casing 1. The terminals 15 extend from the body 16 outwardly beyond the wall of the casing so as to facilitate the connection with the terminals of suitable current conducting wires.

The body 10 of the heating unit is disposed in close proximity to the wall of the water receptacle so that the receptacle will receive heat directly from the unit in addition to the transmittal of heat through the body 10 to water flowing therethrough. The insulation material 7, of course, surrounds the heating unit 9 except that it is not interposed between the unit and the receptacle wall as stated.

A cover or lid 17 is hingedly attached to the top of the water receptacle 3 so that the latter may be tightly closed while the water therein is being heated.

It will, of course, be readily seen that when water is placed in the receptacle 3 and the resistance 14 is heated by the passage of electric current therethrough, a circulation of water will be established from the receptacle into the tubular body 10, the water being heated as it passes through such body and by reason of this circulation, the water of the receptacle will have its temperature quickly raised to the desired degree.

By the provision of the removable plug 11 in the lower end of the tubular body 10, scale may be readily removed from the interior of the tubular body. Such scale will be deposited within the heating body or unit when hard water is used in the receptacle and, therefore, it will be readily seen that this scale must be removed periodically, otherwise the heating efficiency of the device will be interfered with. By removing the bottom cover 2 of the housing, the plug 11 can be readily taken out and a suitable scraping tool introduced into the tubular body 10 for the removal of scale.

What is claimed is:

1. An electric water heater, comprising a water receptacle, a casing enclosing the receptacle, the casing and receptacle being integrally connected at their upper ends, said receptacle having a removable cover, a heating unit interposed between the casing and the receptacle and comprising a tubular body closed at its upper and lower ends and disposed vertically at and in close proximity to the side of the receptacle, coupling nipples connecting the upper and lower ends of the tubular body with the interior of the receptacle and supporting the body upon the receptacle, the tubular body having an electric heating resistance wire thereabout, an insulation material filling the space between the receptacle and the casing, and terminals connected to the ends of said wire and extending through the casing to facilitate the attachment of an electric current carrying line with the ends of the resistance element of the heating unit.

2. An electric water heater, comprising a water receptacle, a casing enclosing the receptacle, the casing and receptacle being integrally connected at their upper ends, said receptacle having a removable cover, a heating unit interposed between the casing and the receptacle and comprising a tubular body closed at its upper and lower ends and disposed vertically at the side of the receptacle, coupling nipples connecting the upper and lower ends of the tubular body with the interior of the receptacle and supporting the body upon the receptacle, the tubular body having an electric heating resistance wire thereabout, an insulation material filling the space between the receptacle and the casing, terminals connected with the ends of said wire and carried by and extending through the wall of the casing facilitating the attachment of an electric current carrying line with the ends of the resistance element of the heating unit, said casing having a removable bottom, means forming a chamber at the lower end of the tubular body and into which said body opens, said chamber being closed at its lower side by said bottom and the closed lower end of the tubular body being in the form of a removable plug accessible from within said chamber for giving access to the interior of the tubular body for the removal of deposit therefrom.

WILLARD F. METZGAR.